(12) United States Patent
Yoshida

(10) Patent No.: US 8,026,895 B2
(45) Date of Patent: Sep. 27, 2011

(54) BACKLIGHT CONTROLLER AND LIQUID CRYSTAL DISPLAY DEVICE

(75) Inventor: Ritsuo Yoshida, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/763,915

(22) Filed: Apr. 20, 2010

(65) Prior Publication Data

US 2011/0007100 A1 Jan. 13, 2011

(30) Foreign Application Priority Data

Jul. 7, 2009 (JP) .................................. 2009-161232

(51) Int. Cl.
*G09G 3/36* (2006.01)

(52) U.S. Cl. .......................................... 345/102; 345/82

(58) Field of Classification Search ............ 345/87–100, 345/102, 204, 76, 82, 690; 349/61
See application file for complete search history.

(56) References Cited

U.S. PATENT DOCUMENTS

| 7,817,171 | B2 * | 10/2010 | Shiomi | ........................ 345/87 |
| 2006/0279522 | A1 | 12/2006 | Kurihara | |
| 2008/0129679 | A1 * | 6/2008 | Yamamoto | .................. 345/102 |

FOREIGN PATENT DOCUMENTS

| JP | 2001-027890 | 1/2001 |
| JP | 2001-134226 | 5/2001 |
| JP | 2001-343957 | 12/2001 |
| JP | 2002-041007 | 2/2002 |
| JP | 2004-191490 | 7/2004 |
| JP | 2007-140436 | 6/2007 |
| JP | 2009-116200 | 5/2009 |

OTHER PUBLICATIONS

Japanese Decision of Grant dated Jul. 13, 2010, Japanese Patent Application No. 2009-161232.

* cited by examiner

*Primary Examiner* — Regina Liang
(74) *Attorney, Agent, or Firm* — Patterson & Sheridan, LLP

(57) ABSTRACT

A backlight controller for controlling a backlight unit having a plurality of light sources arranged in a grid layout for illuminating a liquid crystal panel, the backlight controller including: a first calculator configured to calculate an average value and a standard deviation of control values for controlling the light sources, the control values being obtained from a feature quantity of an input image; a second calculator configured to calculate a ratio of the standard deviation to the average value; and a gain controller configured to control a gain to be applied to the control values based on the ratio calculated by the second calculator.

5 Claims, 5 Drawing Sheets

BACKLIGHT CONTROLLER AND LIQUID CRYSTAL DISPLAY DEVICE

CROSS REFERENCE TO RELATED APPLICATION(S)

The present disclosure relates to the subject matters contained in Japanese Patent Application No. 2009-161232 filed on Jul. 7, 2009, which are incorporated herein by reference in its entirety.

BACKGROUND

1. Field

The present invention relates to a backlight controller that controls light emission of illumination module, such as a backlight unit, for illuminating a liquid crystal panel or the like, and a liquid crystal display device that is provided with the backlight controller.

2. Description of the Related Art

At present, a liquid crystal display device is employed as image display device in a television receiver, a personal computer, a mobile phone, or the like. In the liquid crystal display device, a liquid crystal panel itself does not emit light, and hence, an image is displayed by arranging a backlight on the backside of the liquid crystal panel and illuminating the liquid crystal panel from the backside with the backlight.

In a conventional liquid crystal display device provided with the backlight, there has been known a liquid crystal display device wherein a display screen is divided into a plurality of regions by associating the display screen with individual light sources which constitute the backlight, and wherein area controls in which the individual light sources are controlled for the respective regions of the display screen (respective screen regions) are performed.

Regarding the liquid crystal display device of this type, a liquid crystal display device as described below is disclosed in, for example, JP-A-2004-191490 (counterpart U.S. publication is: US 2006/0279522 A1). In this liquid crystal display device, liquid crystal display portions opposing to the individual light sources are partitioned as blocks, the individual maximum brightness values are calculated from display data which are inputted to the respective blocks, and the brightness of the respective light sources are adjusted in correspondence with the level of the individual maximum brightness values. On the other hand, display values to be inputted to the respective blocks of the liquid crystal display portions are increased in correspondence with the brightness values of the respective light sources.

Although the area controls of the plurality of light sources are described in the above identified publication, any technique pursuing readiness to see a scene of wide dynamic range is not disclosed therein.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
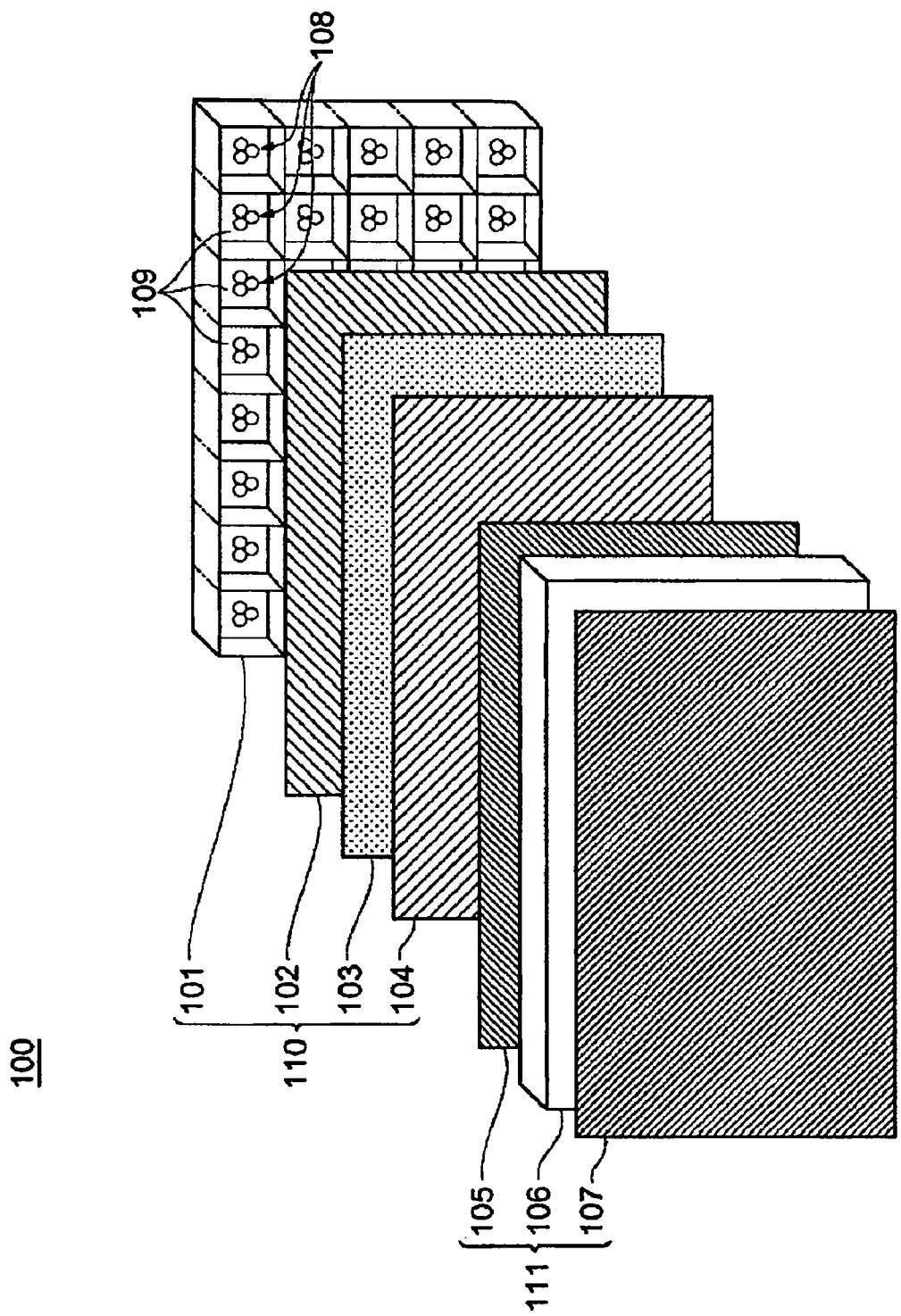
FIG. 1 is an exploded perspective view showing a configuration of a liquid crystal display device according to an embodiment of the present invention.

Hereinafter, an embodiment of the invention will be described with reference to FIGS. 1-5. In the following description, common reference numerals are assigned to common components and elements throughout the drawings.

Figure 2:
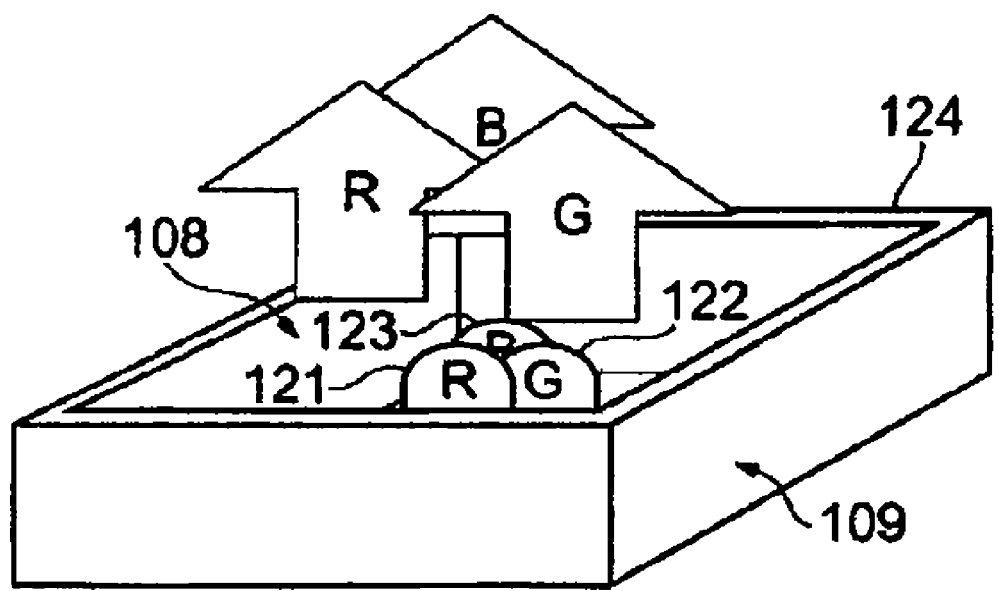
FIG. 2 is a perspective view showing a configuration of a light emission region.

A configuration of a liquid crystal display device 100 according to an embodiment of the present invention will be described with reference to FIGS. 1 and 2. FIG. 1 is an exploded perspective view showing the configuration of the liquid crystal display device 100 according to the embodiment of the present invention, while FIG. 2 is a perspective view showing the configurations of a light source region and a light source.

The liquid crystal display device 100 is employed for a liquid-crystal television receiver or the like, and it includes a backlight 110 and a liquid crystal panel 111 as shown in FIG. 1.

The backlight 110 is provided with a light emission portion 101, and a pair of diffusion plates 102 and 104 between which a prism sheet 103 arranged in front of the light emission portion 101 is sandwiched.

The light emission portion 101 is formed in a panel shape, and has a plurality of light source regions 109 being arranged in a grid layout vertically and horizontally as m rows and n columns. In FIG. 1, the light emission portion 101 including the light source regions 109 of 5 rows and 8 columns is shown as an example.

As shown in FIG. 2, each light source region 109 is surrounded on all sides by a partition wall 124 extending in a direction in which this partition wall overlaps with the diffusion plate 102.

A light source 108, which is configured by three LEDs 121, 122 and 123 each having three primary colors R, G and B, is arranged in each light source region 109. The light source 108 is configured of the red LED 121, green LED 122 and blue LED 123, and it emits light toward the front (the liquid crystal panel 111) while mixing the three colors of red, green and blue. Alternatively, a white LED may well be employed. The backside of the liquid crystal panel 111 is illuminated by the emission lights from the individual light source regions 109, and an image is displayed by adjusting the transmission of the emission lights through the liquid crystal panel 111.

In addition, the liquid crystal display device 100 is of direct type scheme wherein the backlight 110 emits the light over its whole surface by the plurality of light sources 108 arranged in the individual light source regions 109, and wherein the light is projected onto the liquid crystal panel 111 from the back thereof.

The liquid crystal panel 111 includes a pair of polarization plates 105 and 107, and a liquid crystal 106 which is sandwiched between the polarization plates 105 and 107. By the way, in this embodiment, the liquid crystal panel 111 is such that regions corresponding to the respective light source regions 109 form individual screen regions.

Figure 3:
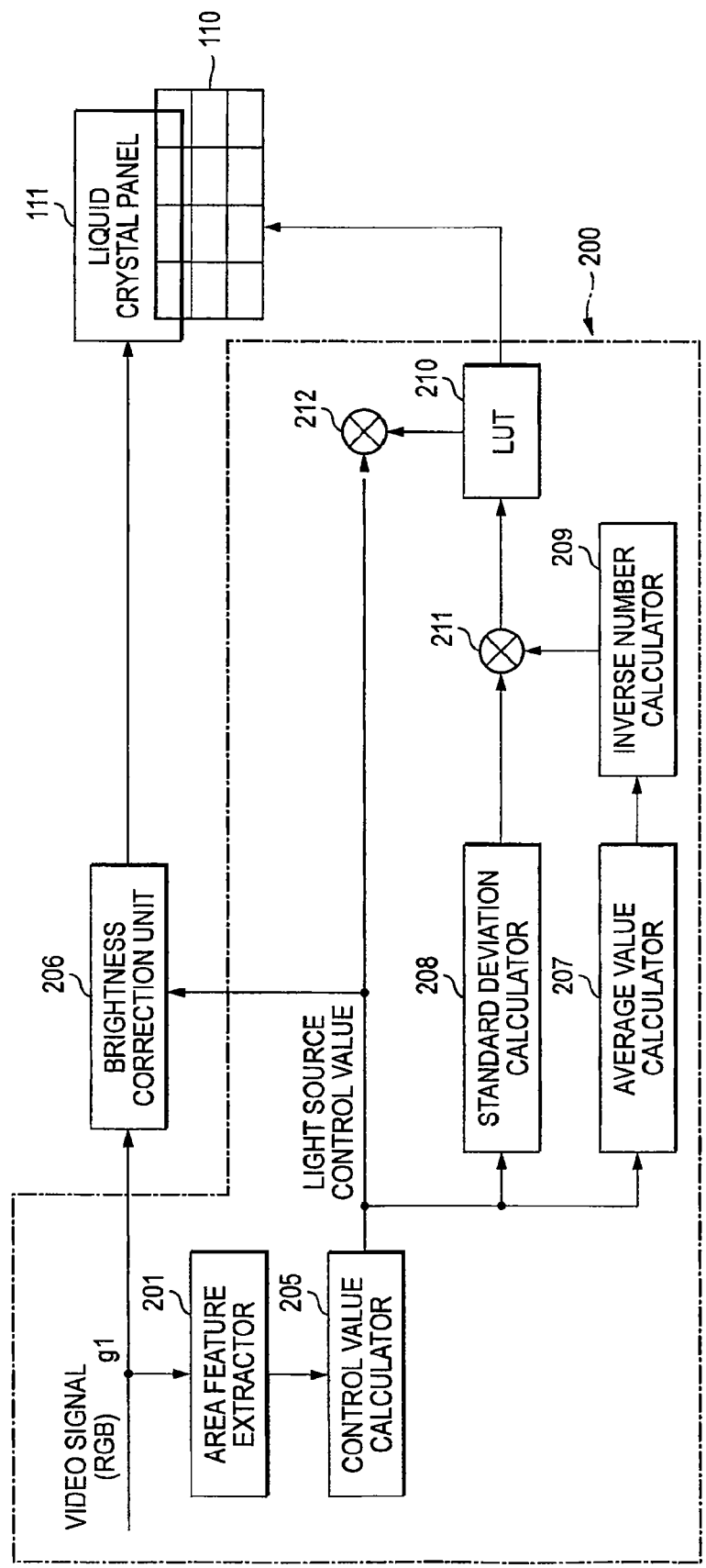
FIG. 3 is a block diagram showing a configuration of a backlight control unit, together with a backlight, a liquid crystal panel and a brightness correction unit.

The configuration of a backlight control unit 200 will be described with reference to FIG. 3. FIG. 3 is a block diagram showing the configuration of the backlight control unit 200, together with the backlight 110 and the liquid crystal panel 111.

The backlight control unit 200 is provided in the liquid crystal display device 100, together with the backlight 110, the liquid crystal panel 111 and a brightness correction unit 206, which are described in detail later.

The backlight control unit 200 includes an area feature extractor 201, a control value calculator 205, an average value calculator 207, a standard deviation calculator 208, an inverse number calculator 209 and a lookup table (LUT) 210. The detailed functions of these portions will be described in operation contents later.

The brightness correction unit 206 corrects and outputs a video signal g1 which is used for image display in the liquid crystal panel 111, in accordance with a control value to be stated later, from the control value calculator 205.

The backlight control unit 200 receives the video signal g1 for displaying an image on the liquid crystal panel 111 and determines the control value as described below, in accordance with the video signal g1, so as to control the light emission of the backlight 110.

First, the area feature extractor 201 extracts a place which emits, for example, the brightest light in a screen region as to each area in accordance with the video signal g1, and it sets a control value (maximum display value) S[m, n] for presenting a display corresponding to the extracted place. The set maximum display value S[m, n] is outputted to the control value calculator 205. Apart from the maximum value of the display values of each area, an average value or a value (such as median) computed from them, may well be used as a feature quantity for determining the control value.

Here, m indicates the row number of the screen region 112 (the corresponding light source region 109), and it is set at any plus integer between 1(one) and M, while n indicates the column number of the screen region 112 (the corresponding light source region 109), and it is set at any plus integer between 1(one) and N. In an example different from that of FIG. 1, the value M is the maximum value of the row number and is 16 by way of example, while the value N is the maximum value of the column number and is 32 by way of example.

Next, the control value calculator 205 sets an initial control value L[m, n] for the light source region to-be-controlled (pertinent light source region), in correspondence with each screen region by using the maximum display value S[m, n]. The initial control value L[m, n] indicates an extent to which the light source 108 is caused to emit light, and it is a value of at least 0(zero) and at most 1(one). Incidentally, the control value calculator 205 may well set the initial control value in consideration of the control values of the light source regions 109 arranged around the pertinent light source region 109. This is because the turn-in of light attributed to the reflection etc. thereof is taken into consideration.

The average value calculator 207 is configured so as to calculate the average value of the control values from the control values outputted from the control value calculator 205, including the initial control value. Besides, the standard deviation calculator 208 calculates a standard deviation from the control values, the calculated result of the average value has its inverse number taken by the inverse number calculator 209, and the inverse number and the standard deviation are multiplied by a multiplier unit 211. The ratio between the standard deviation and the average value is taken owing to the multiplication by the multiplier unit 211, and it is led to the lookup table (LUT) 210. A gain to be stated later is obtained from the ratio by the LUT 210, the gain and the control value are multiplied by a multiplier unit 212, and the resulting product is outputted to the backlight 110.

In the above way, the control values are obtained for the individual light source regions 109, whereby the light emission of the backlight 110 can be controlled.

Figure 4:
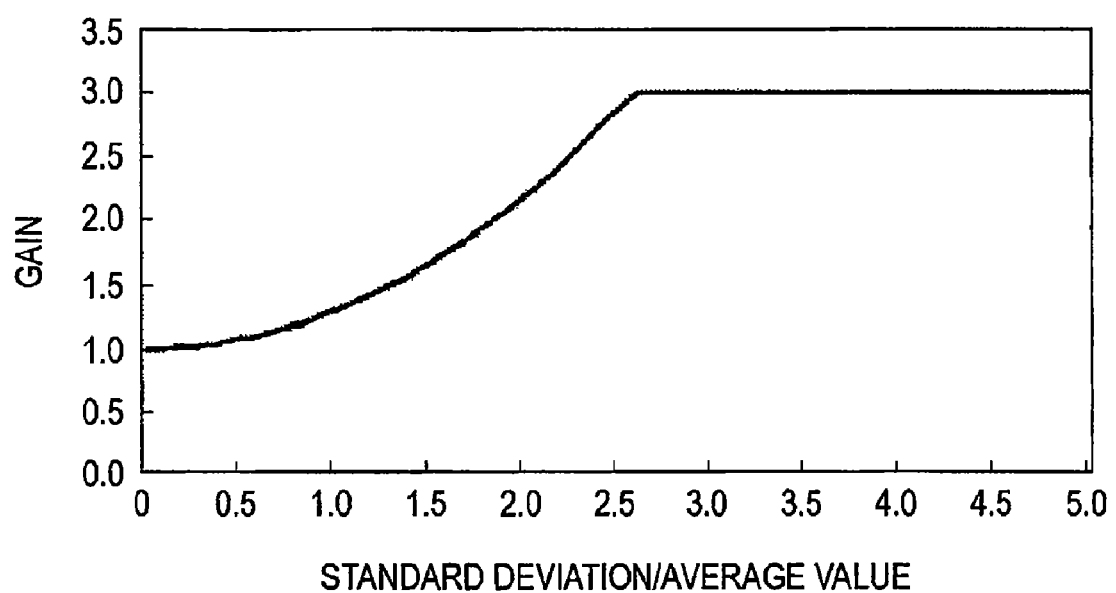
FIG. 4 shows an example of the lookup table of a gain control which is based on the "ratio of the standard deviation of the respective control values of a plurality of light sources, to the average value thereof" in the embodiment.

FIG. 4 shows an example of the lookup table of a gain control (the gain being a value for controlling the display brightness of each frame) based on the "ratio of the standard deviation of the respective control values of the plurality of light sources to the average value thereof". The gain exhibits a monotonous increase in a broad sense with respect to the ratio. According to the lookup table, therefore, a large gain is given to the respective control values of the plurality of light sources in a case where the "ratio of the standard deviation of the respective control values of the plurality of light sources to the average value thereof" is large, and a small gain is given to the respective control values of the plurality of light sources in a case where the "ratio of the standard deviation of the respective control values of the plurality of light sources to the average value thereof" is small. In this example, the gain is clipped at an upper limit of 3.

The relationship between the ratio and the gain is stored in the LUT 210. As shown in FIG. 4, the gain gradually increases until the ratio heightens in excess of 2.5. That is, the display brightness is controlled so as to decrease in a case where the ratio is low, and it is controlled so as to increase in a case where the ratio is high, whereby an image quality (intensity and contrast) and the limitation of the maximum dissipation power are compatible. The display brightness of each frame is controlled in such a way that the respective control values of the plurality of light sources are multiplied by the gain read from the LUT 210.

That is, in a dark scene in which the "ratio of the standard deviation of the respective control values of the plurality of light sources to the average value thereof" is large and which has a wide dynamic range, the light sources are brightly controlled to heighten the display brightness, and in a bright scene in which the "ratio of the standard deviation of the respective control values of the plurality of light sources to the average value thereof" is small or a scene which has a narrow dynamic range, the light sources are darkly controlled to suppress the display brightness.

Accordingly, in the scene which is dark and has the wide dynamic range, the control for heightening the display brightness is performed, thereby to present a display of high peak brightness and excellent contrast feeling. On the other hand, in the bright scene or the scene of the narrow dynamic range, the control for suppressing the display brightness is performed, thereby to present a display which is not too bright and which is readily seen.

Figure 5:
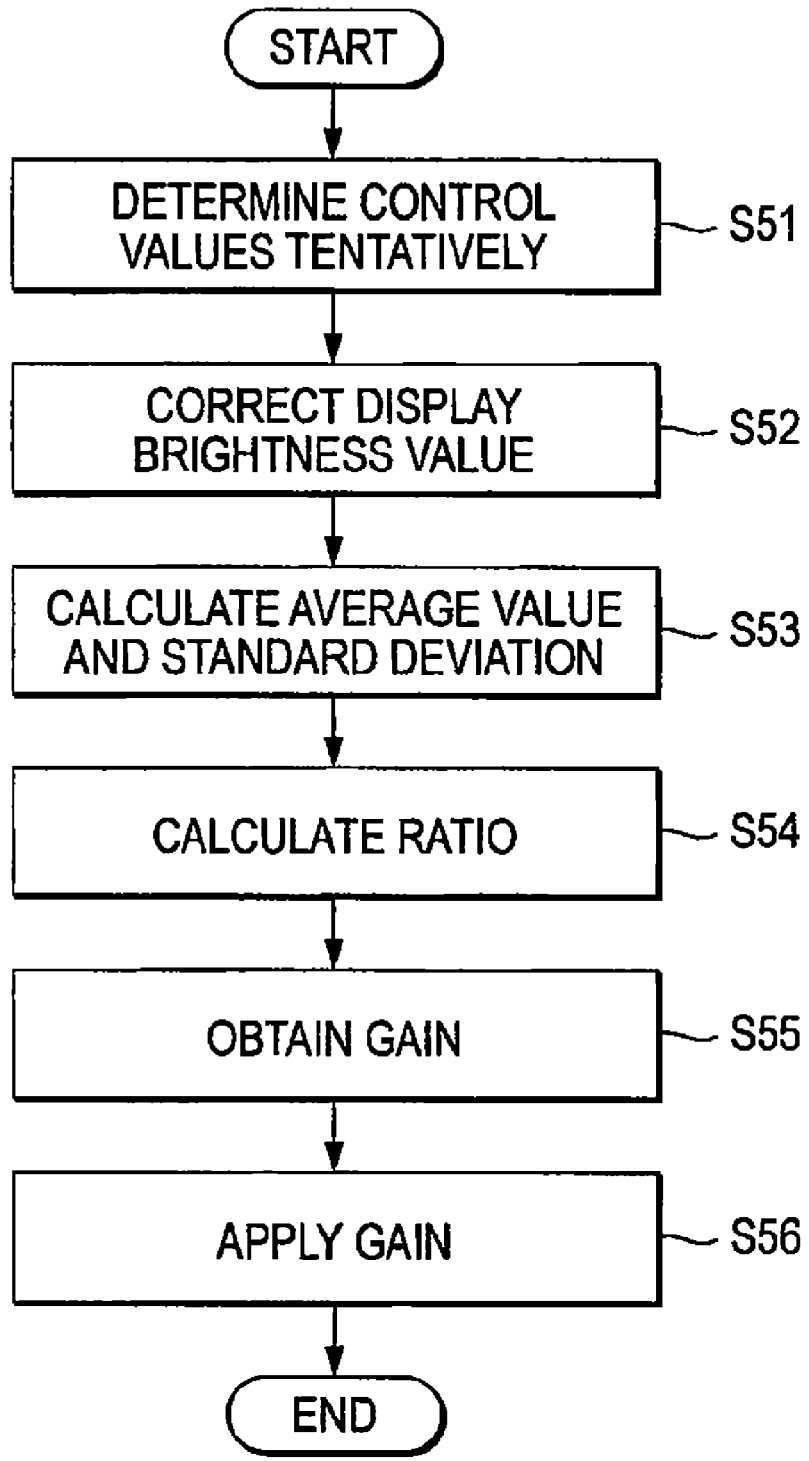
FIG. 5 is a flow chart showing an example of a determination processing procedure for the control value of the backlight control unit which is employed in the embodiment.

FIG. 5 is a flow chart showing an example of a determination processing procedure for the control value of the backlight control unit 200.

Initially, the feature quantity of each area is extracted from the display value of the liquid crystal panel, and the respective control values of the plurality of light sources are tentatively determined based on the feature quantity (step S51). As the feature quantity, there is used, for example, the maximum value or average value of the display values of each area, or a value computed from the maximum and average values.

Subsequently, the display brightness value is corrected based on the respective control values of the plurality of light sources determined tentatively (step S52). That is, in the display area where the control values are small, the display brightness value is increased so as to compensate the control values.

On the other hand, the average value and standard deviation of the respective control values of the plurality of light sources determined tentatively are calculated (step S53). In addition, the ratio of the calculated standard deviation to the calculated average value is calculated (step S54). Further, the calculated ratio is inputted to the lookup table (LUT), whereby a gain is obtained (step S55). The identical gain is given to the respective control values of the plurality of light sources by the multiplier unit (step S56).

As described above, in this, embodiment, the gain control based on the "ratio of the standard deviation of the respective control values of the plurality of light sources to the average value thereof" is performed to attain the feature that, in a case where the calculated ratio is small, the gain is controlled to become small, and that, in a case where the calculated ratio is large, the gain is controlled to become large, whereby the display which has the high peak brightness and which affords the excellent contrast feeling is presented in the dark scene of wide dynamic range, and the display which is not too bright and which is readily seen is permitted in the bright scene.

Although the embodiment according to the present invention has been described above, the present invention is not limited to the above-mentioned embodiments but can be variously modified. Constituent components disclosed in the aforementioned embodiments may be combined suitably to form various modifications. For example, some of all constituent components disclosed in one of the embodiments may be removed or the constituent components disclosed in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source control apparatus for a light emitting module having a plurality of light sources respectively disposed for a plurality of light source areas to illuminate a liquid crystal panel with the light sources, the apparatus for controlling emission of the light sources and comprising:
    a first calculator configured to calculate an average value and a standard deviation of control values of the light sources, the control values being obtained from a feature quantity of an input image;
    a second calculator configured to calculate a ratio of the standard deviation to the average value that are calculated by the first calculator; and
    a gain controller configured to control a gain to be applied to the control values of the light sources based on the ratio calculated by the second calculator.

2. The light source control apparatus of claim 1, wherein the gain is set by a monotonically increasing function related to the ratio.

3. The light source control apparatus of claim 2, wherein the monotonically increasing function is for clipping the gain in a range larger than the ratio.

4. A liquid crystal display device comprising:
    a liquid crystal panel;
    a light emitting module having a plurality of light sources respectively disposed for a plurality of light source areas to illuminate the liquid crystal panel with the light sources; and
    a light source control module configured to control emission of the light sources,
    wherein the liquid crystal display device further comprises:
    a first calculation module configured to calculate an average value and a standard deviation of control values of the light sources, the control values being obtained from a feature quantity of an input image;
    a second calculation module configured to calculate a ratio of the standard deviation to the average value that are calculated by the first calculation module; and
    a gain controlling module configured to control a gain to be applied to the control values of the light sources based on the ratio calculated by the second calculation module.

5. The liquid crystal display device of claim 4 further comprising:
    a correction module configured to correct a video signal for displaying an image on the liquid crystal panel in accordance with the control values of the light sources.

* * * * *